3,001,973
PRODUCTION OF CROSS-LINKED PLASTICS
Hans-Frank Piepenbrink, deceased, late of Leverkusen, Germany, by Ursula B. Piepenbrink, administratrix, Leverkusen, Germany, and Erwin Windemuth, Leverkusen-Bayerwerk, Germany, assignors, by mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed May 19, 1954, Ser. No. 430,982
Claims priority, application Germany May 23, 1953
3 Claims. (Cl. 260—75)

The present invention relates to an improved process for the production of cross-linked plastics.

A great many authors have described processes for the production of cross-linked plastics by reacting two or more compounds containing in the molecule reactive hydrogen atoms with low or high molecular weight di- or polyisocyanates. This reaction leads to linear polymers of the type of thermoplastic soluble products only if carried out with a combination of a bi-functional compound and a diisocyanate. All the previously known methods of producing cross-linked plastics are based on the same principle of manufacture. In every case the active hydrogen atoms migrate to the nitrogen atoms of the isocyanate groups while, at the same time, the N=C-double bonds of the isocyanate groups are eliminated and the reactants cross-linked.

The present invention provides a novel principle for the production of cross-linked plastics which utilizes the known polymerizability of isocyanates. (Zeitschrift Angewandte Chemie 1947, part A, page 267, and Houben-Weyl "Methoden der organischen Chemie," 1952, vol. VIII, page 137.) The process of the invention is fundamentally distinguished over the prior art methods in that no migration of active hydrocarbon atoms takes place in the cross-linking reaction of the components containing isocyanate groups, but cross-linking of the components is effected by polymerization of the therein contained NCO-groups with one another with the elimination of the N=C-double bonds of these NCO-groups.

Polymerization reactions of low molecular weight isocyanates are described in the literature. For instance the production of a thermoinstable dimer from phenyl isocyanate by the action of triethyl phosphine, and the production of a thermostable trimer, the triphenyl isocyanurate, under the action of strong aliphatic tertiary amines, have become known. Italian Letters Patent 405,523 describes a process for the production of high molecular weight products by polymerizing low molecular weight isocyanates under the influence of oxygen or by the interaction of soluble metallic compounds. Furthermore, dimeric arylene diisocyanates can be produced by the reaction of weak alkalies upon arylene diisocyanates, and high molecular weight polyisocyanates can be obtained by subjecting organic polyisocyanates containing at least one isocyanate group linked in aromatic linkage, to the action of aliphatic tertiary amines. Except the process covered by Italian Letters Patent 405,523, which leads to cross-linked plastics by polymerization of diisocyanates, all the aforesaid prior art methods result in the production of low molecular weight products.

The process of the invention is distinguished over these previously known methods in that it leads to the production of the desired cross-linked plastics by the use of, firstly, high molecular weight compounds containing isocyanate groups, for instance the reaction products of two mols of a trifunctional alcohol and more than 3 mols of a diisocyanate or diisocyanate-modified polyester, and secondly, other polymerization catalysts.

In accordance with the present invention cross-linked plastics are obtained by reacting compounds carrying active hydrogen atoms capable of reacting with isocyanate groups with an excess of polyisocyanates over the amount required for the reaction with said active hydrogen atoms in the presence of catalysts capable of inducing polymerization of isocyanates. The catalysts may be present in the addition reaction or may be added at any desired later stage. As the polymerization of olefines or diolefines, the term "polymerization of isocyanates" as used throughout the specification and claims is contemplated to refer to an increase in the molecular weight of isocyanates while their composition is preserved.

Suitable catalysts according to the invention, for instance in the reaction of aromatic polyisocyanates, are basic-reacting substances, especially tertiary amines such as alkyl amines, hexahydrodimethyl aniline, permethylated diethylene triamine or triethylene tetramine, dimethyl piperazine, pyridine, quinoline, or the addition product derived from two mols of phenyl isocyanate and 1 mol of N-methyl diethanolamine. As a general rule for the selection of the catalysts which are useful in any given case there may be said that the basicity of the catalyst shall be the greater the lesser the reactivity of the isocyanate groups to be polymerized, and conversely. Polymerization of highly reactive isocyanates can mostly be accomplished by the presence of the weakly basic urethane group. In the reaction of aliphatic or hydroaromatic isocyanates, polymerization is preferably initiated by means of metallic compounds, which are soluble in organic solvents, for instance ferric acetyl acetonate. Tertiary amines fail to induce polymerization of these isocyanates, as described in United States Letters Patent 2,650,212.

Polymerization of polyisocyanates containing in the molecule isocyanate groups linked in both aromatic and aliphatic linkage can be initiated by both types of polymerization catalysts, singly or in mixture with one another.

It is often advantageous to incorporate the polymerization catalysts into at least one of the compounds to be employed in the manufacture of a polyisocyanate.

Thus, for instance, the polyisocyanate prepared from one mol of N-methyl diethanolamine and two mols of toluylene diisocyanate polymerizes without further additives. The combination of varying proportions of the above-said compound with another polyisocyanate allows of obtaining a component with a controlled polymerization tendency. The same effect is obtained with mixtures of, for instance, N-methyl diethanol amine and other reactive compounds.

The suitability of catalysts for the polymerization of an isocyanate within the scope of the invention can be determined by a polymerization test which is carried out as follows:

An adipic acid ethylene glycol polyester, which is prepared by conventional processes from pure starting materials with the exclusion of atmospheric air, is reacted with an excess of a polyisocyanate to form a polyisocyanate-modified polyester containing 2.1% of NCO-groups. The catalysts to be tested are added to this isocyanate-modified polyester at 140° C. Any polymerizability of the catalysts will be indicated by an increase in the molecular weight of the isocyanate groups. The increase in molecular weight of the isocyanate groups can be determined in simple manner by measuring the viscosity of the isocyanate-modified polyester at the melting point. Care has to be taken that the test is carried out with the absolute exclusion of moisture.

According to the invention cross-linked plastics are produced by polymerizing high molecular weight compounds containing isocyanate groups. These compounds are obtained by reacting any compound containing hydrogen capable of reacting with isocyanate groups with an excess of a polyisocyanate. Suitable compounds according to the invention are for instance the following which may be applied singly or in mixture with one another:

Mono- or polyfunctional alcohol, amines, amino alcohols, carboxylic acids and derivatives of the afore-said substances, for instance carboxylic acid amides, N-alkyl diethanol amines, diol ureas, diol guanidines, hydrazines, polyfunctional compounds having polymerizable double-bonds incorporated, linear or branched saturated or unsaturated polyesters, polyester amides, polyglycol ethers, polyamides and polyurethanes.

It is within the scope of the invention to utilize the new process in combination with previously known cross-linking reactions in which no polymerization of polyisocyanate compounds takes place.

In practicing the invention various methods may be adapted. One method consists in reacting a high molecular weight isocyanate prepared from the above-said reactive compounds and a polyisocyanate, with a polymerization catalyst a short time prior to the final molding operation and hardening the product thus obtained at room temperature or higher temperature to give a cross-linked plastic. This embodiment allows of producing articles of any desired shape by casting.

By a suitable choice of the components employed in the above reaction the physical properties of the resulting polymers can be varied within wide limits. Thus it is possible to produce products having properties which are characteristic of vulcanized rubber as well as products of completely rigid consistency which resemble plastics of the character of phenolformaldehyde compounds of a high degree of cross-linkage. These products can be employed with advantage in suitable combinations as reinforcements in the manufacture of laminated glass. Besides, moldings of all kinds may be made therefrom, for instance printing rollers, swing screens for ore dressing, gear wheels, structural members of machines, protheses and many other articles of any desired shape.

The process of producing cross-linked plastics according to the invention can, of course, be carried out in the presence of solvents containing no hydroxyl groups. This permits the production of coatings on base materials or of adhesives.

According to a preferred embodiment of the invention the desired cross-linked plastics are produced by causing the polyisocyanates to react upon the starting materials in temporarily separate stages. This method makes it possible to produce stable intermediate products for instance by reacting a linear polyester or polyester amide with a deficient amount of a polyisocyanate. These intermediates can be converted into the final cross-linked plastic at any later time convenient to the consumer by adding another amount of the polyisocyanate, thus forming an excess over the amount required for the reaction of the active hydrogen atoms together with the amount of the polyisocyanate applied in the first stage. The polymerization catalysts are preferably incorporated with the mixture along with the addition of the second portion of the isocyanate. Depending upon the nature of the starting materials, the aforesaid stable intermediates are high molecular weight products which are soluble or insoluble in organic solvents and can generally be worked up only by the use of a set of mixing rollers, injection or extrusion molding machines, calenders, pressure screws or other pressing devices.

Suitable additives, for instance fillers, pigments, plasticizers or dyestuffs, may be incorporated within the reaction mixtures yielding the desired cross-linked plastics by casting or within the above described intermediate products.

The invention is further illustrated by the following examples without being restricted thereto; the parts given being by weight.

*Example 1*

100 parts of a polyester, prepared from 4730 parts of adipic acid and 3721 parts of diethylene glycol and having the acid number 0.8 and the hydroxyl number 45.0, are reacted after dehydration with 12 parts of toluylene diisocyanate by heating at 100° C. for one hour to form an isocyanate-modified polyester. 0.56 part of a polymerization catalyst prepared from 1 mol of N-methyl diethanolamine and two mols of phenyl isocyanate are added with stirring to the reaction mass and the pressure is immediately reduced to remove the gas bubbles formed. 5 minutes after the addition of the catalyst the liquid melt is cast into a mold and heated to 120° C. for 12 hours. After this time a bubble-free rubber-elastic molding with a Shore hardness of 54 has been formed. The material is insoluble in organic solvents. The herein-described process allows of producing articles of any desired shape.

*Example 2*

500 parts of a polyester obtained from adipic acid and ethylene glycol and having the acid number 1.2 and the hydroxyl number 60.0 are contacted as described in Example 1 with 85.5 parts of p-phenylene diisocyanate to form an isocyanate-modified polyester containing 3.8% of NCO-groups. 5 parts of a polymerization catalyst prepared from 1 mol of N-diethyl aminoethanol and 1 mol of phenyl isocyanate are added with stirring at 100° C. After removing the gas bubbles under reduced pressure the melt is cast into a mold and heated at 120° C. for 12 hours. A highly elastic molding with a Shore hardness of 64° is obtained. The material is insoluble in organic solvents and shows the properties of a cross-linked plastic.

*Example 3*

400 parts of the polyester described in Example 1 are reacted with 38.5 parts of hexamethylene diisocyanate at 100° C. after dehydration in vacuum. After a reaction time of 1 hour at 100° C., 0.44 part of ferric acetyl acetonate is added with stirring to the isocyanate-modified polyester thus formed. After the components have been thoroughly mixed the gaseous portions are removed by the application of vacuum. The bubble-free melt is cast into molds and heated at 120° C. for 15 hours. After this time the polymerization is practically complete. Homogeneous moldings with marked rubber-elastic properties are thus obtained. The material is distinguished by excellent damping properties which make it suitable for use in the preparation of swing screens. The impact strength of the material is poor.

*Example 4*

400 parts of a resin obtained by polymerizing ethylene oxide, which has the hydroxyl number 61.5, are dehydrated in vacuum at 100° C., reacted with 1.2 parts of terephthalic acid chloride and 72 parts of toluylene diisocyanate, and then stirred at 100° C. for one hour. 2.4 parts of the polymerization catalyst described in Example 1 are stirred into the resulting polyglycol ether isocyanate after removing the gas bubbles by briefly applying a vacuum. By heating the mixture for 12 hours a polymer results which is hard at room temperature and rubber-elastic at moderately elevated temperatures. The polymer is insoluble in all of the known solvents; it swells in water to a substantial extent whereas it is indifferent to aliphatic hydrocarbons, fats and oils.

*Example 5*

100 parts of a polyester, obtained from 5694 parts of adipic acid, 2139 parts of ethylene glycol and 795 parts of diethylene glycol and having the acid number 0.7 and the hydroxyl number 65.0, are reacted after dehydration with 8.1 parts of toluylene diisocyanate to form a soluble highly polymeric condensation product of the viscosity $\eta_s = 0.250$ measured by a 0.1% solution in m-cresol at 25° C. 10 parts of the polyisocyanate prepared from 1 mol of trimethylol propane and 3 mols of toluylene diisocyanate are incorporated on a set of mixing rollers along with 1 part of the polymerization catalysts described in Example 1 and 30 parts of carbon black into 100 parts of the resulting incompletely condensed product, which contains free hydroxyl groups at a minor proportion, to give a homogeneous mixture. The mixture thus obtained, which is soluble in organic solvents, for instance acetone, immediately after its manufacture, can be made into endless tubes by means of an extruder. The tubes become insoluble in organic solvents after storing at room temperature for some days or within a shorter period at elevated temperatures. The mixture is indifferent to aliphatic hydrocarbons, oils and fats and, therefore, suitable in the manufacture of tubes or other moldings which are liable to attacks by the afore-said substances.

We claim:

1. A method for the preparation of a novel crosslinked plastic which comprises mixing as the sole reactive ingredients: (1) an organic compound carrying alcoholic hydroxyl groups, said organic compound being selected from the group consisting of a hydroxyl-terminated polyester prepared by the esterification of a polycarboxylic acid with a polyhydric alcohol, said polyester having a maximum acid number of about 1.2, and a poly-(alkylene ether) glycol with (2) an aliphatic diisocyanate, the ratio of NCO groups to active hydrogren atoms being 1.4–2 NCO groups per one active hydrogen atom, effecting chemical reaction to form an adduct having terminal NCO groups, and then catalytically polymerizing the NCO groups of the adduct with one another under anhydrous conditions employing ferric acetyl acetonate as catalyst, all of said polyisocyanate being added to the first reactant in one stage.

2. Process of claim 1 wherein said organic compound carrying alcoholic hydroxyl groups is a hydroxyl-terminated polyester.

3. Process of claim 2 wherein said hydroxyl-terminated polyester is prepared by the esterification of adipic acid with diethylene glycol.

References Cited in the file of this patent

UNITED STATES PATENTS

| | | |
|---|---|---|
| 2,625,532 | Seeger | Jan. 13, 1953 |
| 2,625,535 | Mastin et al. | Jan. 13, 1953 |
| 2,650,212 | Windemuth | Aug. 15, 1953 |
| 2,683,727 | Mastin et al. | July 13, 1954 |
| 2,729,618 | Muller et al. | Jan. 3, 1956 |
| 2,871,218 | Schollenberger | Jan. 27, 1959 |
| 2,888,433 | Parker | May 26, 1959 |

FOREIGN PATENTS

| | | |
|---|---|---|
| 509,470 | Belgium | Mar. 15, 1952 |
| 152,153 | Australia | July 2, 1953 |

OTHER REFERENCES

Bayer: P.B. Report 45, 246, Jan. 31, 1947.

Monsanto Technical Bulletin No. P–125, Monsanto Chem. Co., St. Louis 4, Mo.

Saunders et al.: Chem. Reviews 43, 203–18 (1948).

Bager: Modern Plastics, June 1947, pp. 149–152, 250, 252, 254, 256, 260 and 262.

Bayer et al.: Rubber Chem. & Tech., 23, 812–835. (1950).

Popper: Rubber Age, April 1953, pp. 81–83.